United States Patent
Kato et al.

(10) Patent No.: US 11,955,644 B2
(45) Date of Patent: Apr. 9, 2024

(54) POWER STORAGE CELL

(71) Applicant: TOYOTA JIDOSHA KABUSHIKI KAISHA, Toyota (JP)

(72) Inventors: Masashi Kato, Konan (JP); Mizuho Matsumoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/707,219

(22) Filed: Mar. 29, 2022

(65) Prior Publication Data

US 2022/0320524 A1    Oct. 6, 2022

(30) Foreign Application Priority Data

Mar. 31, 2021    (JP) .................. 2021-060106

(51) Int. Cl.
*H01M 4/70*    (2006.01)
(52) U.S. Cl.
CPC ..................... *H01M 4/70* (2013.01)
(58) Field of Classification Search
CPC ....................................... H01M 4/70
See application file for complete search history.

(56) References Cited

U.S. PATENT DOCUMENTS

2002/0127469 A1*  9/2002  Mori ................ H01M 50/1243
429/219

FOREIGN PATENT DOCUMENTS

JP    2019209890 A  * 12/2019
JP    2020-173989 A    10/2020

OTHER PUBLICATIONS

Machine translation of JP 2019209890 A (Year: 2019).*

* cited by examiner

*Primary Examiner* — Matthew T Martin
*Assistant Examiner* — Unique Jenevieve Luna
(74) *Attorney, Agent, or Firm* — Sughrue Mion, PLLC

(57) ABSTRACT

A power storage cell comprises an electrode assembly, a collector plate that has the first electrode sheet connected thereto, and a laminate film, wherein the collector plate has a peripheral edge portion including an inner side located closer to the electrode assembly and an outer side located on a side opposite to the electrode assembly with respect to the inner side, the collector plate is provided with a welding portion and an adhesive portion, and when a direction from the inner side toward the outer side is defined as a first direction and a direction intersecting the first direction is defined as a second direction, the welding portion and the adhesive portion are aligned in the second direction.

2 Claims, 15 Drawing Sheets

POWER STORAGE CELL

This nonprovisional application is based on Japanese Patent Application No. 2021-060106 filed on Mar. 31, 2021 with the Japan Patent Office, the entire contents of which are hereby incorporated by reference.

BACKGROUND

Field

The present disclosure relates to a power storage cell.

Description of the Background Art

A conventionally known power storage cell comprises an electrode assembly, a collector plate connected to the electrode assembly, and a laminate film sealing the electrode assembly.

For example, Japanese Patent Laying-Open No. 2020-173989 discloses a power storage cell comprising an electrode assembly, an exterior covering the electrode assembly, and a collector plate connected to the electrode assembly.

The electrode assembly is composed of a plurality of positive electrode plates, a plurality of separators, and a plurality of negative electrode plates stacked in layers. A positive electrode current collecting lead is formed for each positive electrode plate, and a negative electrode current collecting lead is formed for each negative electrode plate.

The exterior is formed of two laminate films. The exterior has a shorter side portion, at which the collector plate externally projects from an interior of the exterior. Specifically, the collector plate externally projects between the two laminate films.

Inside the exterior, the collector plate has an upper surface with a welding portion and an adhesive portion formed thereon. The welding portion is located inside the exterior and welds a plurality of current collecting leads. The adhesive portion is formed outwardly of the welding portion. The adhesive portion adheres the laminate film to an upper surface of the collector plate.

SUMMARY

For the above-described power storage cell, on the upper surface of the collector plate, the welding portion and the adhesive portion are aligned in a direction in which the collector plate projects from the inside of the exterior to the outside of the exterior. Therefore, inside the exterior, a space is created between the welding portion and the adhesive portion. This results in a reduced occupancy of the interior of the exterior by the electrode assembly.

The present disclosure has been made in view of the above-described problem, and an object thereof is to provide a power storage cell allowing an improved occupancy of an interior of an exterior by an electrode assembly.

According to the present disclosure, a power storage cell comprises an electrode assembly that is composed of a first electrode sheet, a separator and a second electrode sheet stacked in layers, a collector plate that is disposed adjacent to the electrode assembly and has the first electrode sheet connected thereto, and a laminate film that seals the electrode assembly and the collector plate inside, wherein the collector plate has a peripheral edge portion including an inner side located closer to the electrode assembly and an outer side located on a side opposite to the electrode assembly with respect to the inner side, the collector plate is provided with a welding portion having the first electrode sheet welded thereto, and at least one adhesive portion that adheres the laminate film, and when a direction from the inner side toward the outer side is defined as a first direction and a direction intersecting the first direction is defined as a second direction, the welding portion and the adhesive portion are aligned in the second direction.

The above power storage cell can reduce wasteful space inside the laminate film and increase occupancy inside the laminate film by the electrode assembly.

The laminate film includes a first film that covers the electrode assembly on one side and a second film that covers the electrode assembly on another side, and the power storage cell further comprises a fusing portion that fuses a peripheral portion of the first film and a peripheral portion of the second film together. The fusing portion is located outwardly of the collector plate and the electrode assembly, and formed annularly along the peripheral portion of the first film and the peripheral portion of the second film.

The adhesive portion is a plurality of such adhesive portions spaced in the second direction, and the welding portion is disposed between the adhesive portions.

The adhesive portion has a hole that exposes a portion of the collector plate, an exposure hole is formed through a portion of the laminate film that faces the hole, and a portion of the collector plate is formed so as to be externally exposed through the hole and the exposure hole.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a perspective view schematically showing a power storage module 20, bus bars 21, 22, and the like.

DESCRIPTION OF THE PREFERRED EMBODIMENTS

A power storage cell and a power storage device according to an embodiment will now be described with reference to FIGS. 1 to 19. Of the configurations shown in FIGS. 1 to 19, any configuration that is identical or substantially identical is identically denoted and will not be described redundantly.

Figure 1:
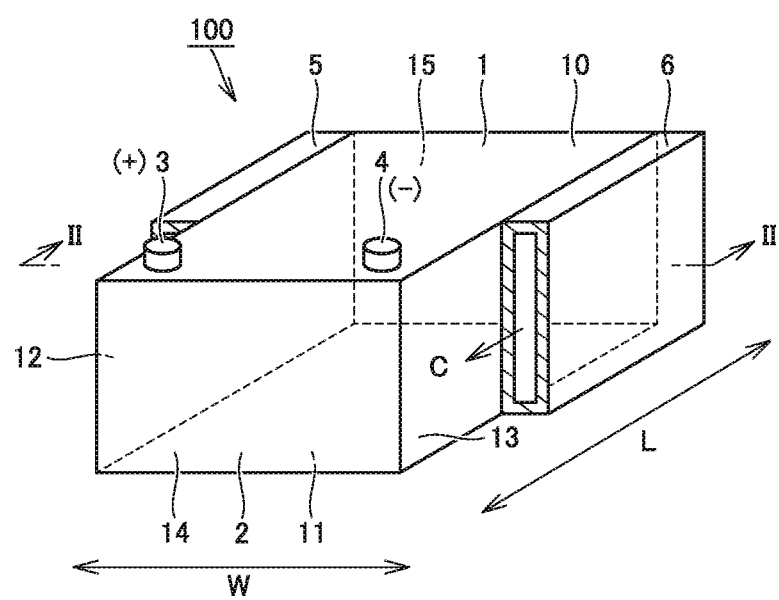
FIG. 1 is a perspective view schematically showing a power storage device 1 and the like according to an embodiment.

FIG. 1 is a perspective view schematically showing a power storage device 1 and the like according to an embodiment. A battery pack 100 comprises power storage device 1 and cooling devices 5 and 6. Power storage device 1 includes an accommodation case 2, a positive electrode's external terminal 3, and a negative electrode's external terminal 4.

Accommodation case 2 is formed generally in a rectangular parallelepiped. Accommodation case 2 includes a top plate 10, a bottom plate 11, lateral walls 12 and 13, and end walls 14 and 15. Lateral walls 12 and 13 are aligned in a widthwise direction W and formed to extend in a longitudinal direction L. End walls 14 and 15 are aligned in longitudinal direction L and formed to extend in widthwise direction W.

The positive electrode's external terminal 3 and the negative electrode's external terminal 4 are provided on an upper surface of top plate 10. The positive electrode's external terminal 3 and the negative electrode's external terminal 4 are spaced in widthwise direction W.

Cooling device 5 is disposed on lateral wall 12, and cooling device 6 is disposed on lateral wall 13. Coolant C flows through cooling devices 5 and 6. In FIG. 1, cooling devices 5 and 6 are partially shown in cross section and thus omitted.

Figure 2:
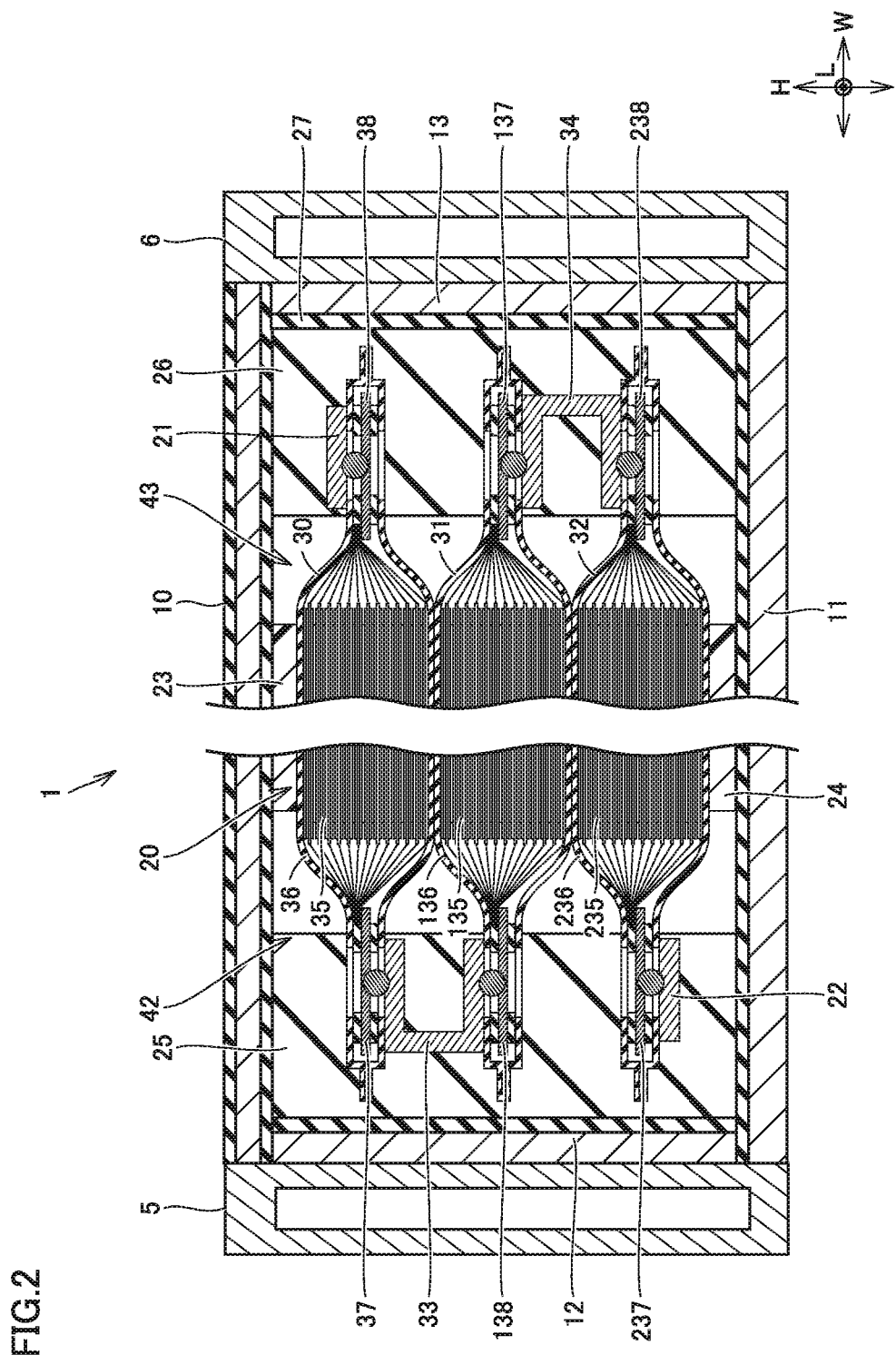
FIG. 2 is a cross-sectional view taken along a line II-II indicated in FIG. 1.

FIG. 2 is a cross-sectional view taken along a line II-II indicated in FIG. 1. Power storage device 1 includes a power storage module 20, bus bars 21 and 22 connected to power storage module 20, expansion absorbing materials 23 and 24, insulating members 25 and 26, and an insulating film 27.

Figure 3:
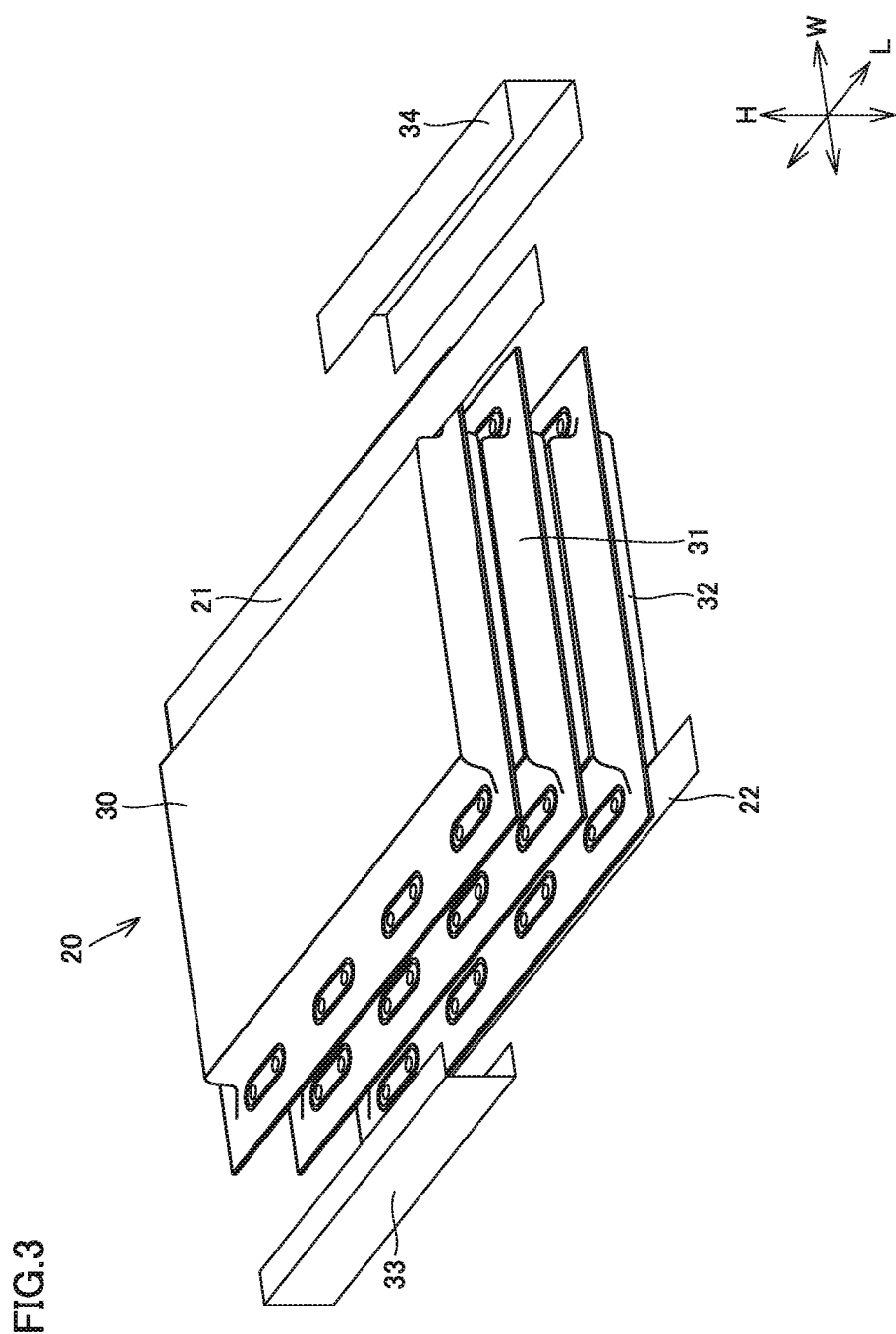

FIG. 3 is a perspective view schematically showing power storage module 20, bus bars 21, 22, and the like. Power storage module 20 includes a plurality of power storage cells 30, 31 and 32 stacked in a stacking direction H, and a plurality of connecting members 33 and 34.

Power storage cells 31 and 32 have substantially the same configuration as power storage cell 30, and accordingly, power storage cell 30 will be described.

Figure 4:
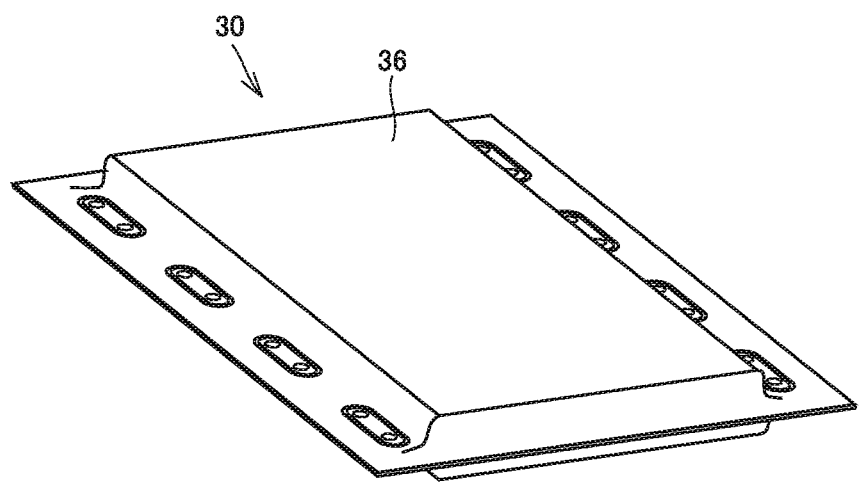
FIG. 4 is a perspective view of a power storage cell 30.
Figure 5:
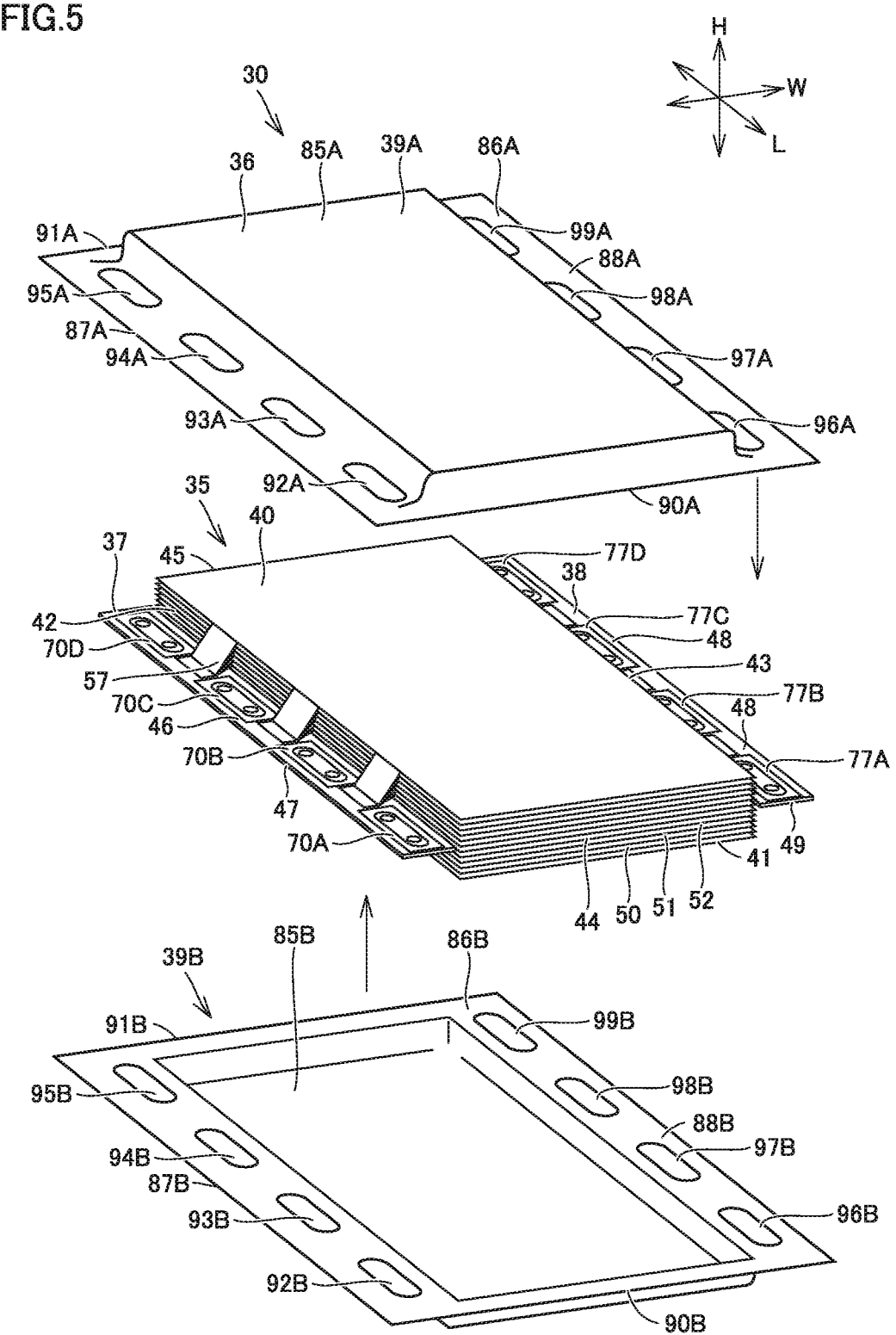
FIG. 5 is an exploded perspective view of power storage cell 30.

FIG. 4 is a perspective view of power storage cell 30, and FIG. 5 is an exploded perspective view of power storage cell 30. Power storage cell 30 includes an electrode assembly 35, a laminate film 36, a positive electrode collector plate 37, and a negative electrode collector plate 38.

Laminate film 36 has a structure composed of a resin film, an aluminum foil, and a resin film stacked in layers. Laminate film 36 seals electrode assembly 35, positive electrode collector plate 37, negative electrode collector plate 38, and an electrolyte (not shown) therein.

Electrode assembly 35 is formed generally in a rectangular parallelepiped. Electrode assembly 35 includes an upper surface 40, a lower surface 41, lateral surfaces 42 and 43, and end surfaces 44 and 45. Lateral surfaces 42 and 43 are aligned in widthwise direction W and formed to extend in longitudinal direction L. End surfaces 44 and 45 are aligned in longitudinal direction L and formed to extend in widthwise direction W. A length of lateral surfaces 42, 43 in longitudinal direction L is longer than a length of end surfaces 44, 45 in widthwise direction W.

Positive electrode collector plate 37 is provided on the side of lateral surface 42 of electrode assembly 35, and negative electrode collector plate 38 is provided on the side of lateral surface 43 of electrode assembly 35.

Electrode assembly 35 includes a plurality of positive electrode sheets 50, a plurality of separators 51, and a plurality of negative electrode sheets 52 stacked in stacking direction H. The sheets are stacked such that separator 51 is disposed between positive electrode sheet 50 and negative electrode sheet 52.

Figure 6:
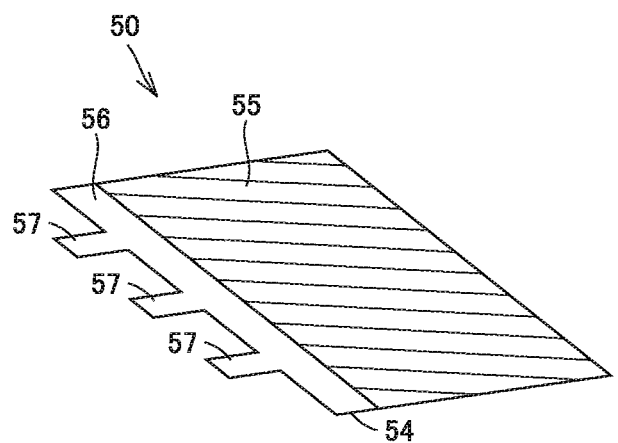
FIG. 6 is a perspective view schematically showing a positive electrode sheet 50.

FIG. 6 is a perspective view schematically showing positive electrode sheet 50. Positive electrode sheet 50 includes an aluminum foil 54 and a positive electrode composite material layer 55 formed on the front and back surfaces of aluminum foil 54.

Aluminum foil 54 is formed in a rectangle. A portion of aluminum foil 54 on the side of one longer side is free of positive electrode composite material layer 55 and hence has an exposed portion 56.

Aluminum foil 54 includes a connecting piece 57 formed at exposed portion 56. A plurality of connecting pieces 57 are formed such that they are spaced in a direction in which aluminum foil 54 extends.

Figure 7:
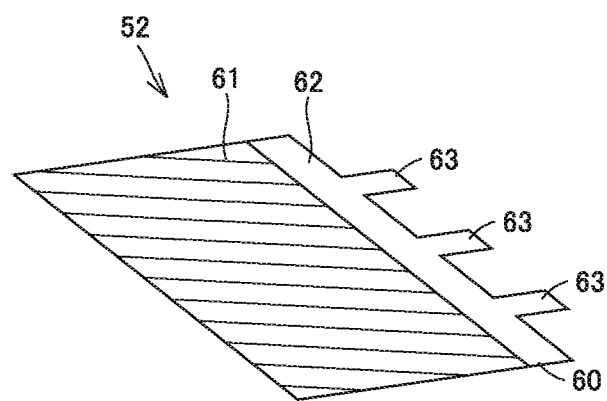
FIG. 7 is a plan view schematically showing a negative electrode sheet 52.

FIG. 7 is a perspective view schematically showing negative electrode sheet 52. Negative electrode sheet 52 includes a copper foil 60 and a negative electrode composite material layer 61 formed on the front and back surfaces of copper foil 60. Copper foil 60 is formed in a rectangle, and has one side free of negative electrode composite material layer 61 and hence has an exposed portion 62. Negative electrode sheet 52 includes a connecting piece 63 formed at exposed portion 62. Connecting pieces 63 are formed such that they are spaced in a direction in which copper foil 60 extends.

Referring back to FIG. 5, positive electrode collector plate 37 is provided on the side of lateral surface 42 of electrode assembly 35, and negative electrode collector plate 38 is provided on the side of lateral surface 43 of electrode assembly 35.

Herein, in longitudinal direction L, positive electrode collector plate 37 is formed to extend from one end side of lateral surface 42 to the other end side of lateral surface 42. Similarly, negative electrode collector plate 38 is formed to extend from one end side of lateral surface 43 to the other end side of lateral surface 43. Thus, positive and negative electrode collector plates 37 and 38 are formed to be elongate in longitudinal direction L.

Positive electrode collector plate 37 is formed in a flat plate and includes a major surface 46 and a major surface 47. Major surface 46 is an upper surface, and major surface 47 is a lower surface. Connecting piece 57 formed at each positive electrode sheet 50 is welded to major surface 46.

Figure 8:
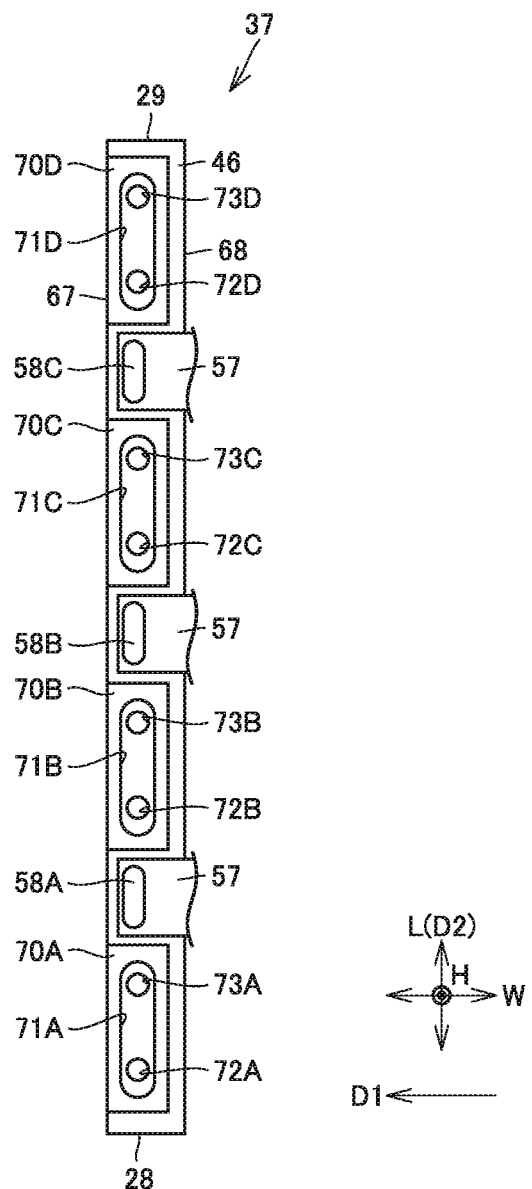
FIG. 8 is a plan view of a major surface 46 of a positive electrode collector plate 37 and a configuration surrounding the major surface.

FIG. 8 is a plan view of major surface 46 of positive electrode collector plate 37 and a configuration surrounding the major surface.

A plurality of adhesive materials 70A, 70B, 70C and 70D are formed on major surface 46 of positive electrode collector plate 37 such that they are each spaced in longitudinal direction L.

Adhesive materials 70A, 70B, 70C and 70D are substantially identical, and adhesive material 70A will be described.

Adhesive material 70A is formed of thermoplastic resin or the like. A hole 71A is formed through adhesive material 70A, and a portion of major surface 46 is exposed through hole 71A. Through holes 72A and 73A are formed through a portion of positive electrode collector plate 37 that is exposed through hole 71A. Through holes 72A and 73A are spaced in longitudinal direction L. Through holes 72A and 73A are formed to extend from major surface 46 to reach major surface 47.

Adhesive materials 70B, 70C, and 70D also have holes 71B, 71C, and 71D, respectively. Through holes 72B, 73B, 72C, 73C, 72D, 73D are formed through portions of positive electrode collector plate 37 exposed through holes 71B, 71C, 71D.

The plurality of connecting pieces 57 are welded to portions of major surface 46 located between adhesive materials 70A, 70B, 70C and 70D. For example, a plurality of connecting pieces 57 are collectively welded by a welding portion 58A between adhesive material 70A and adhesive material 70B. Between adhesive materials 70B and 70C and between adhesive materials 70C and 70D as well, welding portions 58B and 58C, respectively, each weld a plurality of connecting pieces 57 to major surface 46.

Positive electrode collector plate 37 includes an outer side 67 and an inner side 68, and a short side 28 and a short side 29. Outer side 67 and inner side 68 are formed to extend in longitudinal direction L. Outer side 67 is located on one end side in widthwise direction W, and inner side 68 is located on the other end side in widthwise direction W. Inner side 68 is located closer to electrode assembly 35, and outer side 67 is located on a side opposite to electrode assembly 35 with respect to inner side 68. Short side 28 is located on one end side in longitudinal direction L, and short side 29 is located on the other end side in longitudinal direction L. Short sides 28 and 29 are formed to extend in widthwise direction W. A direction from inner side 68 toward outer side 67 is defined as a direction D1, and a direction intersecting direction D1 is defined as a direction D2. In the present embodiment, direction D2 is longitudinal direction L.

Adhesive materials 70A, 70B, 70C, 70D and welding portions 58A, 58B, 58C are aligned in direction D2. In other words, adhesive materials 70A, 70B, 70C, 70D and welding portions 58A, 58B, 58C are aligned in longitudinal direction L along an outer side 67 of positive electrode collector plate 37.

And welding portion 58A is disposed between adhesive materials 70A and 70B, and welding portions 58B and 58C are also similarly disposed.

Figure 9:
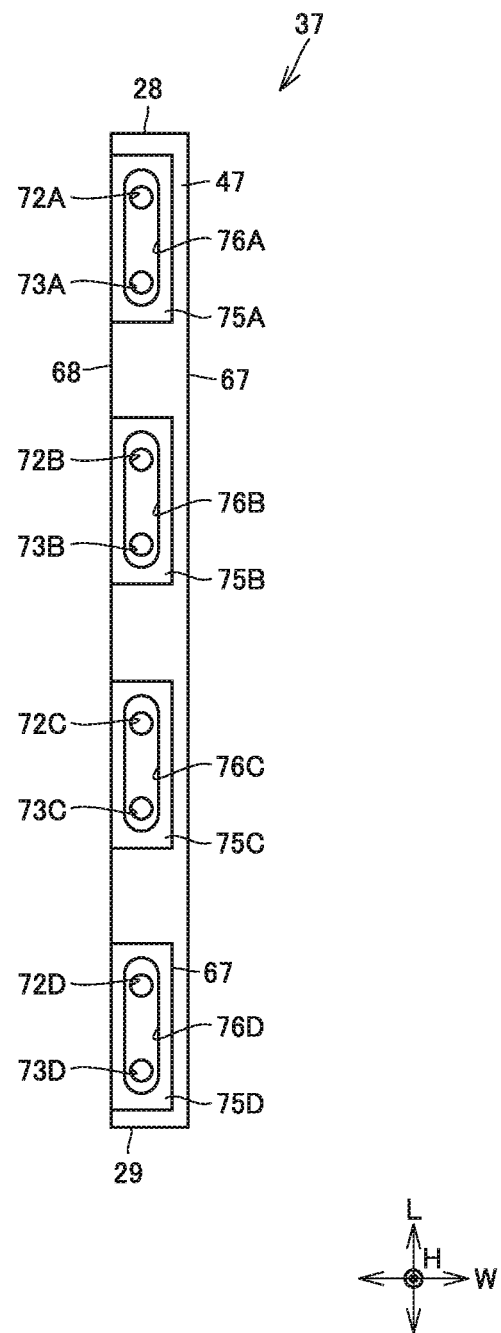
FIG. 9 is a plan view of a major surface 47 of positive electrode collector plate 37.

FIG. 9 is a plan view of major surface 47 of positive electrode collector plate 37. Major surface 47 is also provided with a plurality of adhesive materials 75A, 75B, 75C and 75D such that they are spaced in longitudinal direction L.

Adhesive materials 75A, 75B, 75C and 75D have holes 76A, 76B, 76C and 76D, respectively. Each hole 76A, 76B, 76C, 76D exposes a portion of major surface 47. Through holes 72A and 73A are formed through a portion of major surface 47 exposed through hole 76A. Similarly, through holes 72B, 73B, 72C, 73C, 72D, 73D are formed through portions of major surface 47 exposed through holes 76B, 76C, 76D.

Herein, adhesive material 70A shown in FIG. 8 and adhesive material 75A shown in FIG. 9 are formed so as to be opposite to each other with positive electrode collector plate 37 interposed therebetween. That is, adhesive material 75A is disposed under adhesive material 70A. Similarly, adhesive materials 70B, 70C, 70D and adhesive materials 75B, 75C, 75D, respectively, are disposed to be opposite to each other.

Figure 10:
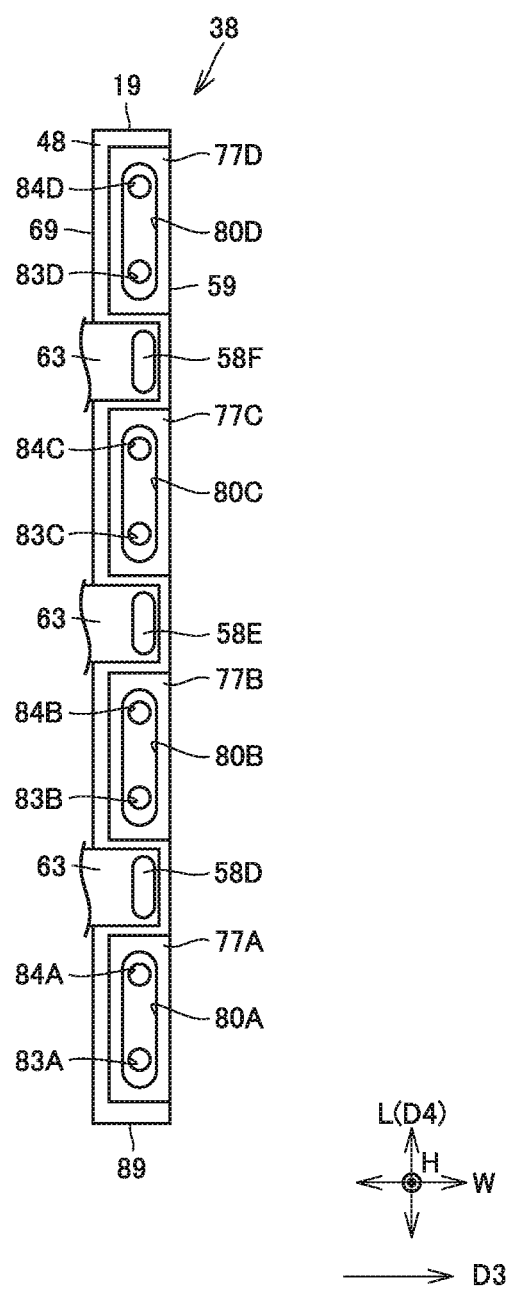
FIG. 10 is a plan view of a major surface 48 of a negative electrode collector plate 38.
Figure 11:
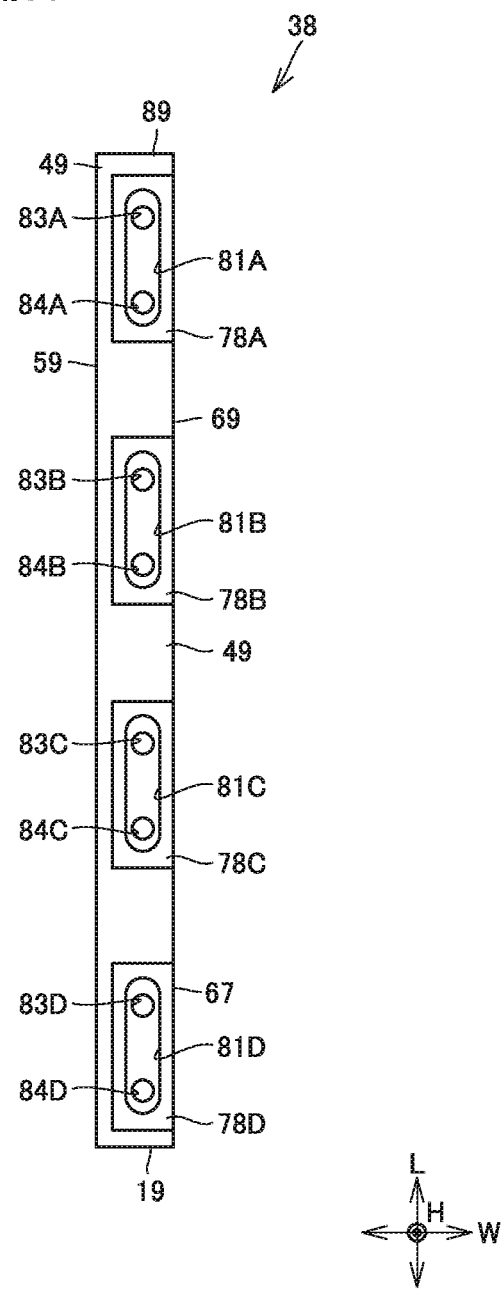
FIG. 11 is a plan view of a major surface 49 of negative electrode collector plate 38.

FIG. 10 is a plan view of major surface 48 of negative electrode collector plate 38, and FIG. 11 is a plan view of major surface 49 of negative electrode collector plate 38. As well as positive electrode collector plate 37, negative electrode collector plate 38 is also provided with a plurality of adhesive materials.

Negative electrode collector plate 38 includes an outer side 59, an inner side 69, a short side 19, and a short side 89. Outer side 59 is located on one end side in widthwise direction W, and inner side 69 is located on the other end side in widthwise direction W. Short side 19 is located at one end in longitudinal direction L, and short side 89 is located at the other end in longitudinal direction L.

A direction from inner side 69 toward outer side 59 is defined as a direction D3, and a direction intersecting direction D3 is defined as a direction D4. Direction D4 is longitudinal direction L.

On major surface 48, a plurality of adhesive materials 77A, 77B, 77C and 77D and a plurality of welding portions 58D, 58E, 58F are formed such that they are aligned in direction D4.

Adhesive materials 77A, 77B, 77C, 77D are spaced in direction D4 (or longitudinal direction L), and welding portions 58D, 58E, 58F are provided between adhesive materials 77A, 77B, 77C, 77D.

In FIG. 11, a plurality of adhesive materials 78A, 78B, 78C and 78D are formed on major surface 49 such that they are spaced in longitudinal direction L. Adhesive material 77A and adhesive material 78A are disposed opposite to each other with negative electrode collector plate 38 interposed therebetween. Similarly, adhesive material 77B and adhesive material 78B are opposite to each other, adhesive material 77C and adhesive material 78C are opposite to each other, and adhesive material 77D and adhesive material 78D are opposite to each other.

Holes 80A, 80B, 80C and 80D are formed through adhesive materials 77A, 77B, 77C and 77D, respectively, and holes 81A, 81B, 81C and 81D are formed through adhesive materials 78A, 78B, 78C and 78D, respectively.

A plurality of through holes 83A, 84A, 83B, 84B, 83C, 84C, 83D and 84D are formed through negative electrode collector plate 38. Through holes 83A and 84B are formed through a portion of negative electrode collector plate 38 exposed through holes 80A and 81A. Similarly, through holes 83B, 84B, 83C, 84C, 83D, 84D are formed through portions exposed through holes 80B, 81B, 80C, 81C, 80D, 81D.

Referring back to FIG. 5, laminate film 36 includes an upper film 39A and a lower film 39B. Upper film 39A is provided so as to cover electrode assembly 35, positive electrode collector plate 37, and negative electrode collector plate 38 from above. Lower film 39B is provided so as to cover electrode assembly 35, positive electrode collector plate 37, and negative electrode collector plate 38 from below. Upper film 39A includes a covering portion 85A and a peripheral portion 86A.

Peripheral portion 86A is formed at a peripheral edge portion of covering portion 85A annularly. Covering portion 85A is formed so as to protrude upward, and is formed so as to cover electrode assembly 35 from above.

Peripheral portion 86A includes a flange 87A, a flange 88A, and connecting pieces 90A and 91A. Flanges 87A and 88A are formed to extend in longitudinal direction L.

Connecting piece 90A is formed to interconnect one end of flange 87A and one end of flange 88A. Connecting piece 91A is formed to interconnect the other end of flange 87A to the other end of flange 88A.

Flange 87A is disposed on major surface 46 of positive electrode collector plate 37, and flange 88A is disposed on major surface 48 of negative electrode collector plate 38.

Flange 87A has a plurality of exposure holes 92A, 93A, 94A and 95A such that they are spaced in longitudinal direction L. Flange 87A is disposed such that exposure holes 92A, 93A, 94A and 95A are positioned at adhesive materials 70A, 70B, 70C and 70D, respectively. Adhesive materials 70A, 70B, 70C and 70D adhere flange 87A to positive electrode collector plate 37. Exposure holes 92A, 93A, 94A and 95A and holes 71A, 71B, 71C and 71D externally expose a portion of major surface 46 of positive electrode collector plate 37.

Flange 88A also has a plurality of exposure holes 96A, 97A, 98A and 99A such that they are spaced in longitudinal direction L. Flange 88A is disposed such that exposure holes 96A, 97A, 98A and 99A are positioned at adhesive materials 77A, 77B, 77C and 77D, respectively. Exposure holes 96A, 97A, 98A and 99A and holes 80A, 80B, 80C and 80D externally expose a portion of major surface 48. Adhesive materials 77A, 77B, 77C and 77D adhere flange 88A to negative electrode collector plate 38.

Lower film 39B is configured to be similar to upper film 39A. Lower film 39B includes a flange 87B, a flange 88B, and connecting pieces 90B and 91B. Flange 87B is disposed on major surface 47 of positive electrode collector plate 37, and flange 88B is disposed on major surface 49 of negative electrode collector plate 38.

Flange 87B has a plurality of exposure holes 92B, 93B, 94B and 95B such that they are spaced in longitudinal direction L. Flange 87B is disposed such that exposure holes 92B, 93B, 94B and 95B are positioned at adhesive materials 75A, 75B, 75C and 75D, respectively. Exposure holes 92B, 93B, 94B and 95B and holes 76A, 76B, 76C and 76D externally expose a portion of major surface 47. Adhesive materials 75A, 75B, 75C and 75D adhere flange 87B to positive electrode collector plate 37.

Flange 88B has a plurality of exposure holes 96B, 97B, 98B and 99B such that they are spaced in longitudinal direction L. Flange 88B is disposed such that exposure holes 96B, 97B, 98B and 99B are positioned at adhesive materials 78A, 78B, 78C and 78D, respectively. Exposure holes 96B, 97B, 98B and 99B and holes 81A, 81B, 81C and 81D externally expose a portion of major surface 49. Adhesive materials 78A, 78B, 78C and 78D adhere flange 88B to negative electrode collector plate 38.

Figure 12:
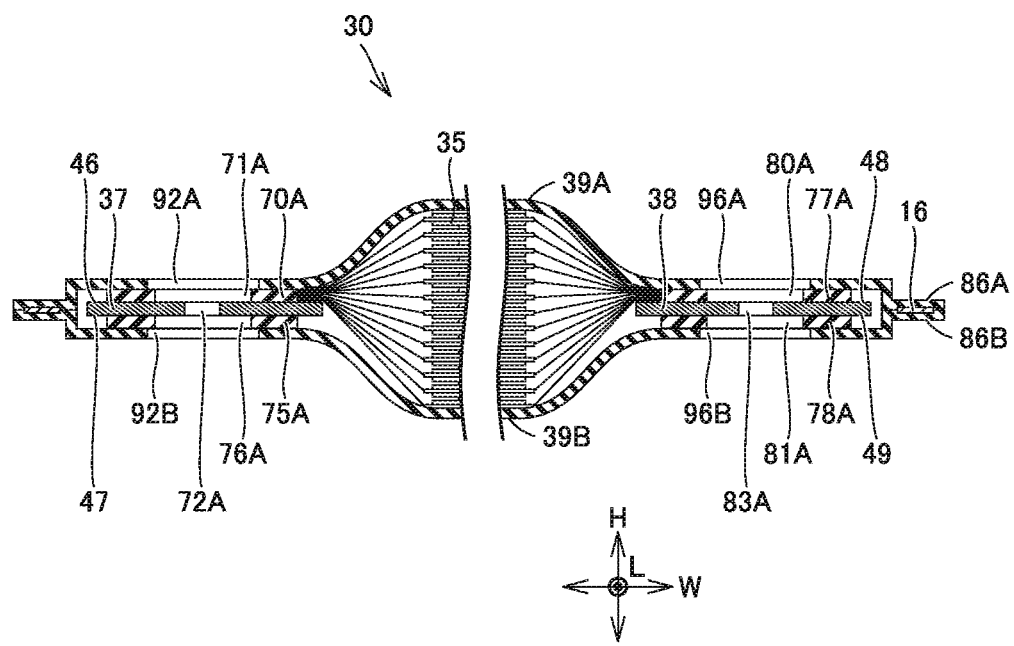
FIG. 12 is a cross-sectional view of power storage cell 30.

FIG. 12 is a cross-sectional view of power storage cell 30. In FIG. 12, peripheral portions 86A and 86B have their respective peripheral edge portions located outside electrode assembly 35, positive electrode collector plate 37, and negative electrode collector plate 38.

The peripheral edge portion of the lower surface of peripheral portion 86A and the peripheral edge portion of the upper surface of peripheral portion 86B are adhered to each other at a fusing portion 16. Fusing portion 16 is formed to extend annularly. Thus, electrode assembly 35, positive electrode collector plate 37, negative electrode collector plate 38, and the electrolyte (not shown) are sealed inside laminate film 36.

Thus, positive and negative electrode collector plates 37 and 38 are not formed so as to project between upper and lower films 39A and 39B. Therefore, a gap is not formed between laminate film 36 and positive and negative electrode collector plates 37 and 38 on the side of a lateral surface of positive electrode collector plate 37. This can suppress external leakage of the electrolyte provided inside power storage cell 30, intrusion of foreign matters into power storage cell 30, and the like.

In FIG. 12, a portion of major surface 46 of positive electrode collector plate 37 is exposed through exposure hole 92A and hole 71A. A portion of major surface 47 is exposed through exposure hole 92B and hole 76A. Negative electrode collector plate 38 also has major surfaces 48 and 49 partially exposed from laminate film 36.

Figure 13:
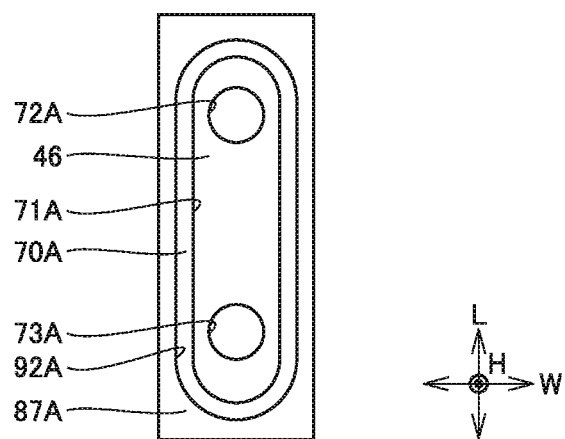
FIG. 13 is a plan view of an exposure hole 96A and a hole 71A.

FIG. 13 is a plan view of exposure hole 92A and hole 71A. Hole 71A of adhesive material 70A extends along exposure hole 92A of flange 87A, and adhesive material 70A is formed along exposure hole 92A. Exposure hole 92A has an opening area larger than that of hole 71A. When viewed at a position away from stacking direction H, hole 71A is located in exposure hole 92A. As a result, intrusion of foreign matters into laminate film 36 is suppressed.

Although power storage cell 30 has been described above, power storage cells 31 and 32 are also configured to be similar to power storage cell 30.

In FIGS. 2 and 3, power storage cell 31 includes an electrode assembly 135, a laminate film 136, a positive electrode collector plate 137, and a negative electrode collector plate 138. In power storage cell 31 as well, positive electrode collector plate 137 includes a pair of major surfaces, and a portion exposed from laminate film 136 is formed on each major surface. Similarly, a portion exposed from laminate film 136 is formed on each major surface of negative electrode collector plate 138.

Power storage cell 32 includes an electrode assembly 235, a laminate film 236, a positive electrode collector plate 237, and a negative electrode collector plate 238. A portion exposed from laminate film 236 is formed on each major surface of positive electrode collector plate 237. A portion exposed from laminate film 236 is formed on each major surface of negative electrode collector plate 238.

On the side of lateral surface 42 of electrode assembly 35, positive electrode collector plate 37, negative electrode collector plate 138, and positive electrode collector plate 237 are aligned in stacking direction H. On the side of lateral surface 43, negative electrode collector plate 38, positive electrode collector plate 137, and negative electrode collector plate 238 are aligned in stacking direction H.

Bus bar 21 is welded to a portion of negative electrode collector plate 38 exposed from laminate film 36. Bus bar 22 is welded to a portion of positive electrode collector plate 237 exposed from laminate film 236. Bus bar 21 is connected to the negative electrode's external terminal 4, and bus bar 22 is connected to positive electrode's external terminal 3.

Connecting member 33 is formed to extend in longitudinal direction L. Connecting member 33 is disposed between positive and negative electrode collector plates 37 and 138, and interconnects positive and negative electrode collector plates 37 and 138.

Connecting member 33 is welded to a portion of positive electrode collector plate 37 exposed from laminate film 36, and connecting member 33 is welded to a portion of negative electrode collector plate 138 exposed from laminate film 136.

Connecting member 34 is disposed between positive and negative electrode collector plates 137 and 238, and interconnects positive and negative electrode collector plates 137 and 238. Connecting member 34 is welded to a portion of positive electrode collector plate 137 exposed from laminate film 136.

Thus, power storage cells 30, 31 and 32 are electrically connected in series by connecting members 33 and 34.

Insulating member 25 is introduced to reach power storage module 20 from lateral wall 12. Insulating member 25 is formed to contact connecting member 33 and also cover positive electrode collector plate 37, negative electrode collector plate 138, and positive electrode collector plate 237.

Therefore, when power storage device 1 is charged/discharged and power storage module 20 thus generates heat, the heat of power storage module 20 can be radiated to cooling device 5 through connecting member 33, positive electrode collector plate 37, negative electrode collector plate 138, positive electrode collector plate 237, and insulating member 25.

Insulating member 26 is introduced to reach power storage module 20 from lateral wall 13. Insulating member 26 is formed to contact connecting member 34 and also cover negative electrode collector plate 38, positive electrode collector plate 137, and negative electrode collector plate 238. This allows power storage module 20 to radiate heat to cooling device 6 satisfactorily.

Expansion absorbing materials 23 and 24 include a dilatancy material and a sealing member that seals the dilatancy material. Expansion absorbing material 23 is disposed between power storage module 20 and top plate 10, and expansion absorbing material 24 is disposed between power storage module 20 and bottom plate 11.

When power storage device 1 is charged/discharged, power storage module 20 deforms so as to bulge in stacking direction H. Since power storage module 20 deforms at a small rate, expansion absorbing materials 23 and 24 deform so as to permit deformation of power storage module 20.

Thus, even when power storage module 20 deforms so as to bulge, application of a load to accommodation case 2, and hence deformation of accommodation case 2 can be suppressed.

When battery pack 100 is mounted in a vehicle or the like, and the vehicle travels or the like, power storage device 1 is vibrated. When power storage device 1 vibrates, for example, power storage device 1 may vibrate so that the center of power storage device 1 serves as an antinode.

A deformation rate when power storage device 1 vibrates is faster than a rate at which power storage module 20 deforms as power storage device 1 is charged/discharged.

For such a fast deformation rate, expansion absorbing materials 23 and 24 including the dilatancy material are increased in rigidity and thus resistant to deformation. This can suppress vibration of power storage device 1.

Figure 14:
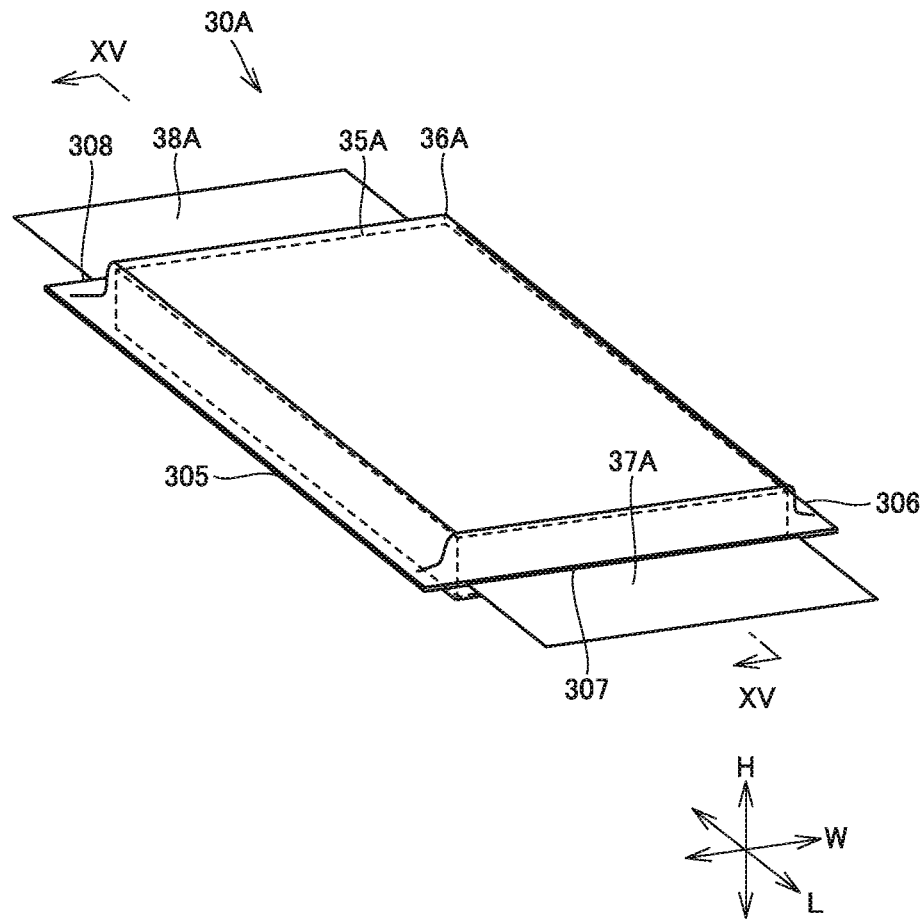
FIG. 14 is a perspective view of a power storage cell 30A according to a comparative example.

FIG. 14 is a perspective view of a power storage cell 30A according to a comparative example. Power storage cell 30A includes an electrode assembly 35A, a laminate film 36A, a positive electrode collector plate 37A, and a negative electrode collector plate 38A.

Laminate film 36A has a peripheral edge portion generally in a rectangle. The peripheral edge portion of laminate film 36A includes longer sides 305 and 306 and shorter sides 307 and 308.

Positive electrode collector plate 37A projects from shorter side 307 to an outside of laminate film 36A, and negative electrode collector plate 38A projects from shorter side 308 to an outside of laminate film 36A.

Figure 15:
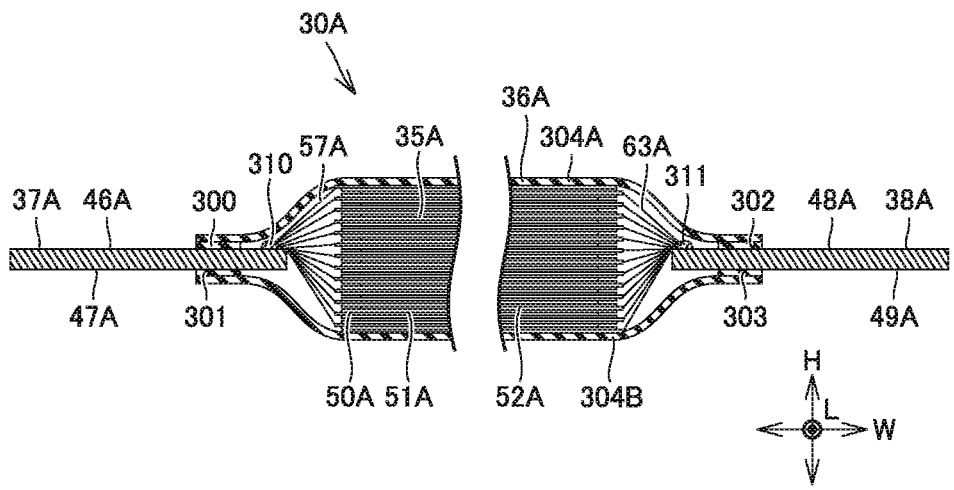
FIG. 15 is a cross-sectional view of power storage cell 30A.

FIG. 15 is a cross-sectional view of power storage cell 30A. Electrode assembly 35A includes a plurality of positive electrode sheets 50A, a plurality of separators 51A, and a plurality of negative electrode sheets 52A.

Figure 16:
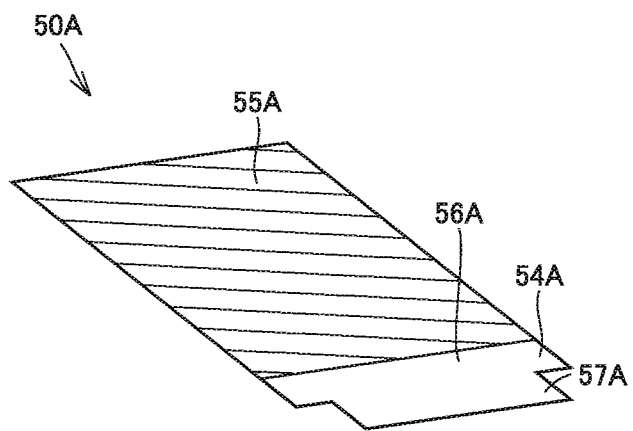
FIG. 16 is a perspective view of a positive electrode sheet 50A.

FIG. 16 is a perspective view of positive electrode sheet 50A. Positive electrode sheet 50A includes an aluminum foil 54A and a positive electrode composite material layer 55A.

Positive electrode composite material layer 55A is formed on the front and back surfaces of aluminum foil 54A. Aluminum foil 54A is formed in a rectangle. Aluminum foil 54A has an exposed portion 56A free of positive electrode composite material layer 55A. Exposed portion 56A is located at a shorter side portion of aluminum foil 54A. Positive electrode sheet 50A includes a connecting piece 57A projecting from exposed portion 56A.

Figure 17:
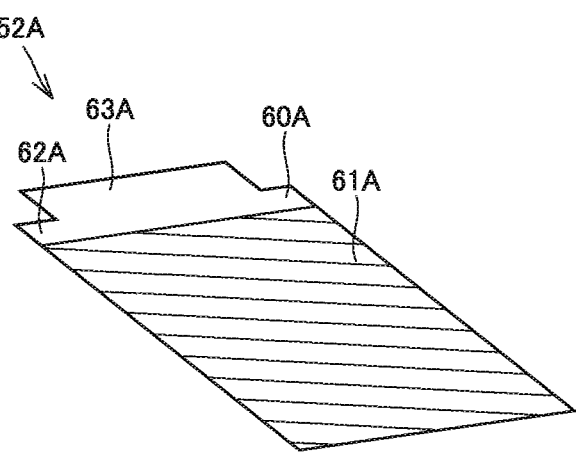
FIG. 17 is a perspective view of a negative electrode sheet 52A.

FIG. 17 is a perspective view of negative electrode sheet 52A. Negative electrode sheet 52A includes a copper foil 60A and a negative electrode composite material layer 61A. Negative electrode composite material layer 61A is formed on the front and back surfaces of copper foil 60A. Copper foil 60A is also formed in a rectangle. Copper foil 60A has a shorter side portion free of negative electrode composite material layer 61A, that is, an exposed portion 62A. Negative electrode sheet 52A includes a connecting piece 63A projecting from exposed portion 62A.

Referring back to FIG. 15, laminate film 36A includes an upper film 304A and a lower film 304B.

Upper film 304A is provided so as to cover electrode assembly 35A from above, and lower film 304B is provided so as to cover electrode assembly 35A from below.

Positive electrode collector plate 37A is formed in a flat plate and includes a major surface 46A and a major surface 47A. Major surface 46A is an upper surface, and major surface 47A is a lower surface.

A welding portion 310 and an adhesive material 300 are provided on major surface 46A of positive electrode collector plate 37A, and an adhesive material 301 is provided on major surface 47A.

A plurality of connecting pieces 57A are welded at welding portion 310. Adhesive material 300 adheres upper film 304A and positive electrode collector plate 37A together. Adhesive material 301 adheres lower film 304B and positive electrode collector plate 37A together. Adhesive materials 300 and 301 are disposed opposite to each other with positive electrode collector plate 37A interposed therebetween.

A welding portion 311 and an adhesive material 302 are provided on major surface 48A of negative electrode collector plate 38A, and an adhesive material 303 is provided on major surface 49A. Adhesive materials 302 and 303 are disposed opposite to each other with negative electrode collector plate 38A interposed therebetween. Welding portion 311 welds a plurality of connecting pieces 63A to major surface 48A. Adhesive material 302 adheres upper film 304A to negative electrode collector plate 38A, and adhesive material 303 adheres lower film 304B to negative electrode collector plate 38A.

Figure 18:
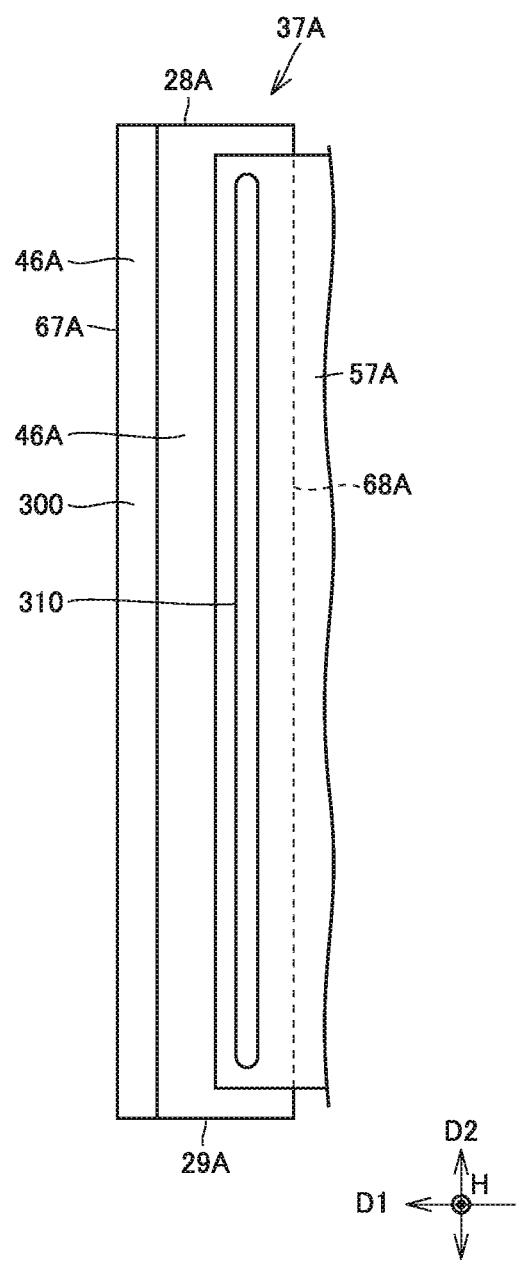
FIG. 18 is a plan view of a major surface 46A of a positive electrode collector plate 37A.

FIG. 18 is a plan view of major surface 46A of positive electrode collector plate 37A. Adhesive material 300 is located on the side of an outer side 67A, and welding portion 310 is located on the side of an inner side 68A. A space is present between adhesive material 300 and welding portion 310 in direction D1 from inner side 68A toward outer side 67A.

In contrast, as shown in FIG. 8, power storage cell 30 according to the present embodiment has adhesive material 70A, welding portion 58A, adhesive material 70B, welding portion 58B, adhesive material 70C, welding portion 58C, and adhesive material 70D aligned in direction D2.

This suppresses formation of a space in direction D1 by adhesive materials 70A, 70B, 70C, 70D and welding portions 58A, 58B, 58C.

Thus, an occupancy inside laminate film 36 by electrode assembly 35 for power storage cell 30 of the present embodiment is larger than an occupancy by electrode assembly 35A for power storage module 20A of the comparative example.

Further, in FIG. 8, welding portions 58A, 58B, 58C are formed such that they are spaced, and the plurality of connecting pieces 57 are welded to positive electrode collector plate 37 by welding portions 58A, 58B, 58C.

This allows charging/discharging to be done while achieving a uniform distribution of a current in positive electrode sheet 50 and can minimize a locally degraded portion in positive electrode sheet 50.

Figure 19:
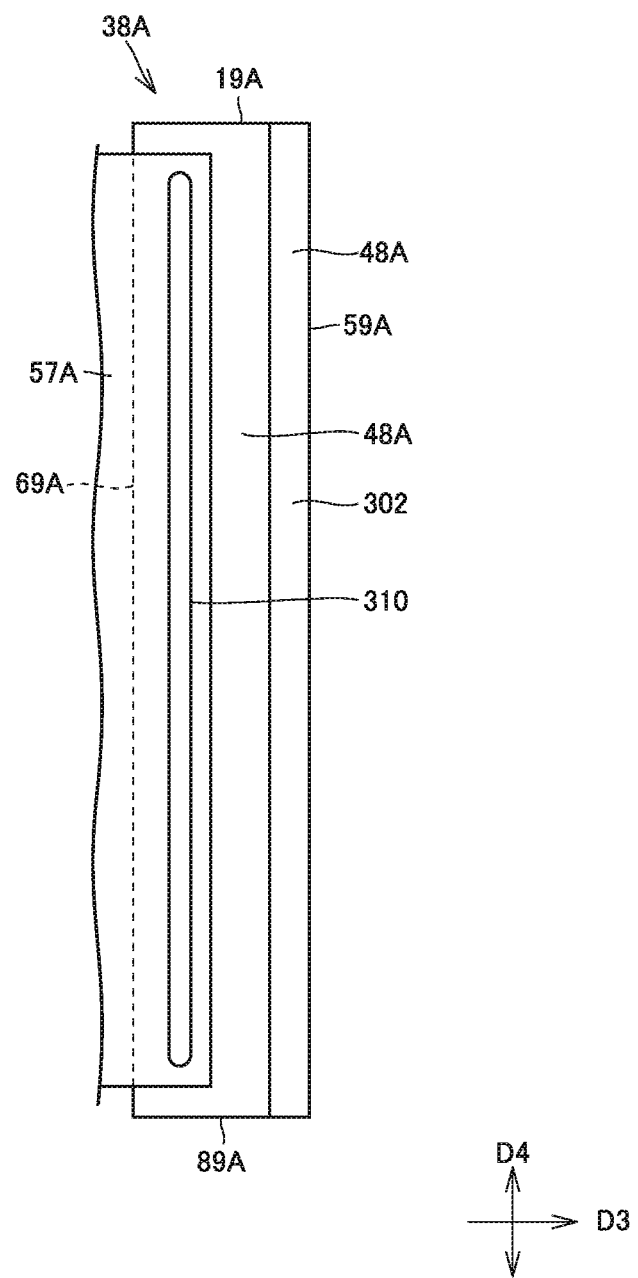
FIG. 19 is a plan view of a major surface 48A of a negative electrode collector plate 38A.

FIG. 19 is a plan view of major surface 48A of negative electrode collector plate 38A. In direction D3 from an inner side 69A toward an outer side 59A, adhesive material 302 and welding portion 311 are spaced from each other. Accordingly, a space is created between adhesive material 302 and welding portion 311 in direction D3.

In contrast, as shown in FIG. 10, for power storage cell 30, the plurality of adhesive materials 77A, 77B, 77C and 77D and the plurality of welding portions 58D, 58E, 58F are aligned in direction D4, which suppresses formation of a space in direction D3. Power storage cell 30 of the present embodiment thus has an increased occupancy inside laminate film 36 by electrode assembly 35. While the above embodiment has been described for an example with each power storage cell accommodating electrolyte therein, the art according to the present disclosure is also applicable when each power storage cell is a solid-state battery.

While an embodiment of the present disclosure has been described, it should be understood that the embodiment disclosed herein has been described for the purpose of illustration only and in a non-restrictive manner in any respect. The scope of the present disclosure is defined by the terms of the claims, and is intended to include any modifications within the meaning and scope equivalent to the terms of the claims.

What is claimed is:

1. A power storage cell comprising:
    an electrode assembly that is composed of a plurality of first electrode sheets, a plurality of separators, and a plurality of second electrode sheets stacked in layers;
    a collector plate that is disposed adjacent to the electrode assembly and has the first electrode sheet connected thereto;
    a laminate film that seals the electrode assembly and the collector plate inside, wherein
        the laminate film includes a first film that covers the electrode assembly on one side and a second film that covers the electrode assembly on another side,
        the collector plate has a peripheral edge portion including an inner side located closer to the electrode assembly and an outer side located on a side opposite to the electrode assembly with respect to the inner side,
        the collector plate is provided with a welding portion having a plurality of connecting pieces welded thereto, and at least one adhesive portion that adheres the laminate film,
        each of the plurality of first electrode sheets has a metal foil including one of the plurality of connecting pieces, and
        when a direction from the inner side toward the outer side is defined as a first direction and a direction intersecting the first direction is defined as a second direction, the welding portion and the adhesive portion are aligned in the second direction; and
    a fusing portion that fuses a peripheral portion of the first film and a peripheral portion of the second film together, wherein
        the fusing portion is located outwardly of the collector plate and the electrode assembly, and formed annularly along the peripheral portion of the first film and the peripheral portion of the second film,
        the adhesive portion has a hole that exposes a portion of the collector plate,
        a portion of the laminate film has an exposure hole that faces the hole, and
        a portion of the collector plate is externally exposed through the hole and the exposure hole.

2. The power storage cell according to claim 1, wherein the adhesive portion is a plurality of such adhesive portions spaced in the second direction, and the welding portion is disposed between the adhesive portions.

* * * * *